US007512492B2

(12) United States Patent
Irvin et al.

(10) Patent No.: US 7,512,492 B2
(45) Date of Patent: Mar. 31, 2009

(54) SYSTEM AND METHOD FOR DETECTING INTERFERENCE IN GLOBAL POSITIONING SATELLITE SIGNALS

(75) Inventors: Dean Irvin, South Riding, VA (US); Lee Sweetapple, Springfield, VA (US); Greg Gerten, Dayton, OH (US)

(73) Assignee: General Dynamics Advanced Information Systems, Inc., Fairfax, VA (US)

( * ) Notice: Subject to any disclaimer, the term of this patent is extended or adjusted under 35 U.S.C. 154(b) by 1172 days.

(21) Appl. No.: 10/270,236

(22) Filed: Oct. 15, 2002

(65) Prior Publication Data

US 2003/0114983 A1 Jun. 19, 2003

Related U.S. Application Data

(63) Continuation-in-part of application No. 09/833,802, filed on Apr. 13, 2001, now Pat. No. 6,985,812.

(51) Int. Cl.
*G01C 21/00* (2006.01)

(52) U.S. Cl. .............. 701/213; 701/215; 701/216; 342/357.06; 342/357.09; 342/358

(58) Field of Classification Search ......... 701/213–216; 342/357.06, 357.09, 357.1, 358
See application file for complete search history.

(56) References Cited

U.S. PATENT DOCUMENTS

| 5,420,592 | A | * | 5/1995 | Johnson | 342/357.12 |
|---|---|---|---|---|---|
| 5,467,282 | A | * | 11/1995 | Dennis | 701/215 |
| 5,751,244 | A | * | 5/1998 | Huston et al. | 342/357.03 |
| 5,786,773 | A | * | 7/1998 | Murphy | 340/947 |
| 6,111,541 | A | * | 8/2000 | Karmel | 342/357.13 |
| 6,313,789 | B1 | * | 11/2001 | Zhodzishsky et al. | 342/357.12 |
| 6,430,504 | B1 | * | 8/2002 | Gilbert et al. | 701/213 |
| 6,484,097 | B2 | * | 11/2002 | Fuchs et al. | 701/213 |
| 6,693,979 | B1 | * | 2/2004 | Kumar | 375/326 |
| 6,760,663 | B2 | * | 7/2004 | Brenner | 701/213 |
| 6,771,214 | B2 | * | 8/2004 | Kober et al. | 342/357.12 |

FOREIGN PATENT DOCUMENTS

WO    WO89/05460    *    6/1989

* cited by examiner

*Primary Examiner*—Gertrude Arthur Jeanglaud
(74) *Attorney, Agent, or Firm*—Steptoe & Johnson LLP (57) ABSTRACT

A system and method are provided for detecting local interference in GPS signals. A plurality of remotely located GPS receivers are capable of receiving GPS signals and producing GPS related data. A monitoring station is capable of storing at least one expected GPS parameter for each of the plurality of GPS receivers. A first processor at the monitoring station is programmed to determine, for each of the GPS receivers, whether said GPS related data deviates from any of the at least one GPS parameter by more than a predetermined range of error, and for issuing a warning in response thereto.

23 Claims, 9 Drawing Sheets

| Configure GAMES | | | | | ☒ |
|---|---|---|---|---|---|
| Station Name | Games | | | | [ OK ] |
| Log Time | 60 | XY Error Meters | 20 | | Cancel |
| Log Transmit | 600 | Height Error | 50 | | |
| Position Average | 600 | Range Timeout | 30 | | |
| | | Sats Available | 4 | Signal Minimum | 4 |
| No Report | 30 | Sats Timeout | 30 | Signal Timeout | 30 |

FIG. 3

GAMES

Valid Position
- Lat: 31 51 6 — Get Current
- Lon: 116 16 12 — Get Valid
- Height: 1400 — Average
- Time: — Make Valid Current Position
- Epoch — Error
- Lat
- Lon
- Height
- PDOP
- Sats/RSSI
- Anomaly ☐

Start | Configure | Cancel

$$R_1^2 = (x_1 - x_j)^2 + (y_1 - y_j)^2 \implies \boxed{\text{BY SUBSTITUTION}} \implies P_1 = \frac{P_j \lambda^2}{(4\pi R_1)^2}$$

$$\left(\frac{\lambda}{4\pi} \sqrt{\frac{P_j}{P_1}}\right)^2 = (x_1 - x_j)^2 + (y_1 - y_j)^2$$

SOLVE FOR x,y AND P (3 UNKNOWNS); USING 3 BOXES

SYSTEM AND METHOD FOR DETECTING INTERFERENCE IN GLOBAL POSITIONING SATELLITE SIGNALS

CROSS REFERENCE TO RELATED APPLICATIONS

The present application is a continuation-in-part of U.S. patent application Ser. No. 09/833,802, filed Apr. 13, 2001 now U.S. Pat. No. 6,985,812, the disclosure of which is expressly incorporated herein by reference in its entirety.

BACKGROUND OF THE INVENTION

1. Field of the Invention

The present invention relates to detecting and compensating for interference in Global Positioning System (GPS) signals. More specifically, the present invention relates to a system and method for detecting interference in GPS signals that produce GPS coordinates or related parameters with unacceptable error.

2. Discussion of Background Information

The use of the GPS network to provide positional coordinates is well known. In summary, a GPS receiver receives different time-stamp signals from a network of satellites, and uses known techniques to derive the latitude and longitude coordinates of the GPS receiver. Signals from at least three satellites are necessary for a ground position, and four for an elevated position.

The accuracy of the resulting GPS coordinates is dependent in part on which satellite signals are used to derive the coordinates. Current GPS receivers are capable of selecting signals from a combination of satellites that provide the most accurate readings. For example, signals from satellites on the horizon are known to contribute to highly accurate coordinates, whereas signals from overhead satellites result in less reliable coordinates.

A weakness of the GPS system is that local interference may block one or more signals from the satellites. Since the satellites on the horizon have the weakest signal, local interference that blocks these signals may force the GPS receiver to use stronger signals from overhead satellites. This can reduce the accuracy of the coordinates derived by the GPS receiver by several hundred meters. Even Differential GPS (DGPS), which is a more accurate version of GPS that accounts for various atmospheric conditions, can be adversely affected by local interference.

Recent advancements in miniaturization and manufacturing have led to commercial adoption of GPS devices in vehicles and boats for positional determination.

Efforts are also underway to incorporate, and actively use, GPS devices in airplanes for navigation purposes, particularly in landing operations. However, the effect of local interference on the accuracy of GPS coordinates can introduce hazards into aircraft landing procedures, and has been a significant impediment to the adoption of GPS use in aircraft.

SUMMARY OF THE INVENTION

The present invention provides a system and method for detecting local interference in GPS signals.

According to an embodiment of the invention, there is provided a method for detecting errors in GPS accuracy. The method includes determining an initial GPS position of a marker, receiving GPS signals at the marker, calculating, from the GPS signals, a GPS coordinate position of the marker, comparing the GPS coordinate position and the initial GPS position, and issuing a warning if the GPS coordinate position differs from the initial GPS position by more than a predetermined amount.

According to another embodiment of the invention, there is provided a system for detecting local interference in GPS signals. A GPS receiver is capable of determining its GPS coordinates. A memory is capable of storing an initial location of the GPS receiver and a user-defined range of error. A processor is programmed to determine whether GPS coordinates from the GPS receiver differ from the initial location by more than a range of error, and for issuing a warning in response thereto.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein.

DETAILED DESCRIPTION OF THE EXEMPLARY EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
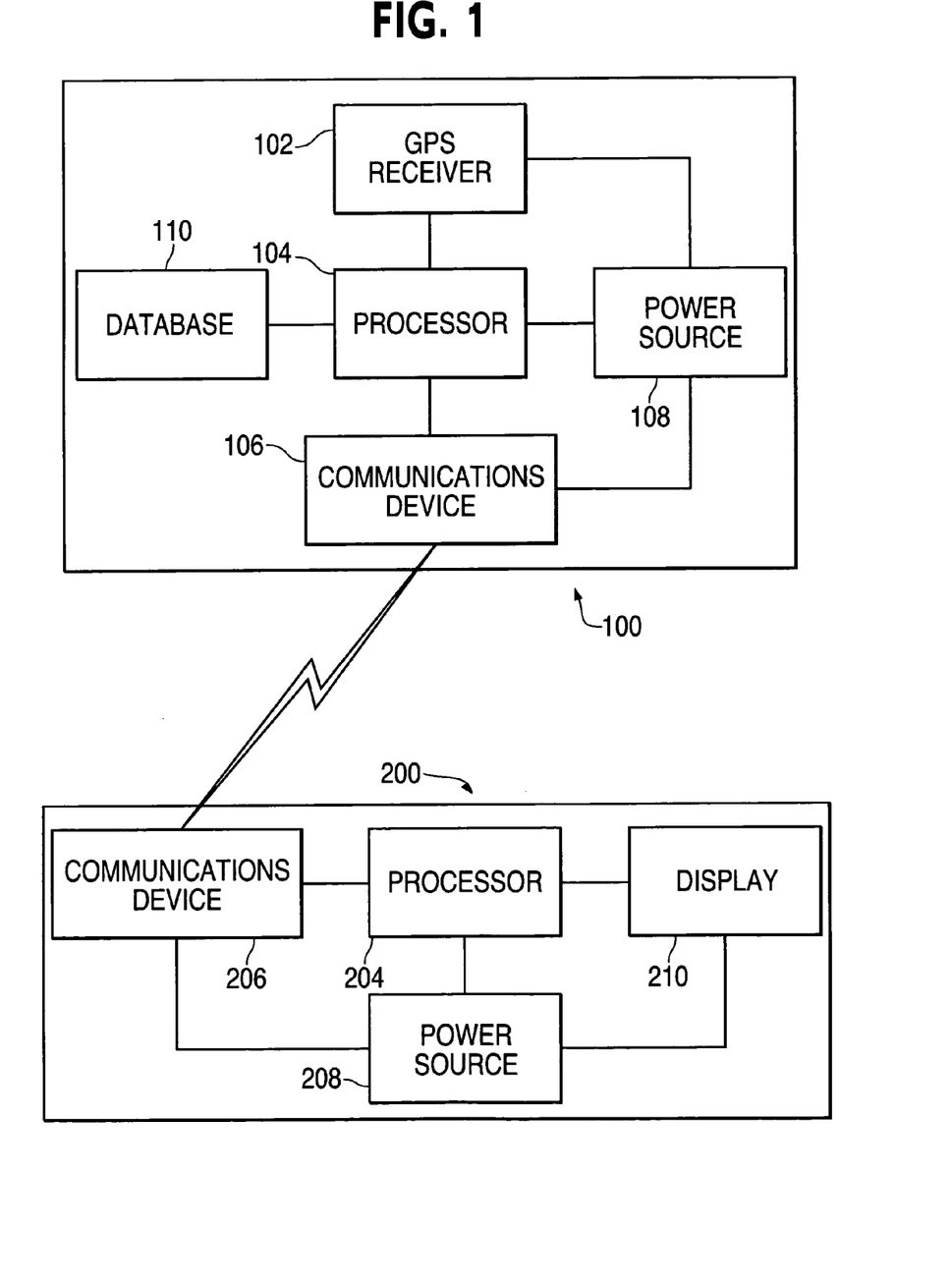
FIG. 1 shows a preferred embodiment of the present invention.

FIG. 1 shows an interference detector 100 that can communicate with a remotely located monitoring unit 200 according to a preferred embodiment of the invention.

Interference detector 100 includes a GPS receiver 102, a processor 104, a communications device 106, a power source 108, and a memory 110. Monitoring unit 200 preferably includes a processor 204, a communications device 206, a power source 208, and a display 210. GPS receiver 102 is preferably a high-end survey grade receiver capable of using at least eight channels that allows data logging through a COM port, such as manufactured by MAGELLAN. Processor 104 is preferably a JORNADA processor for purposes of miniaturization, although processor 204 may be any commercially available processor. Communications devices 106 and 206 may be a radio transmitter or telephone lines (wireless or landline). Power sources 108 and 208 are preferably a battery or standard AC connection. Interference detector 100 communicates with a remotely located monitoring unit 200 through communications devices 106 and 206. Both units may have other equipment consistent with standard computer and GPS operations.

Once being placed at a location, interference detector 100 must be initialized to determine its position. If the exact GPS coordinates of the position are known (e.g., from a site survey), then a user can enter the data directly into processor 104 or memory 110, either remotely through communications device 106 or directly by an appropriate interface (not shown) on interference detector 100. If the position is not known, then processor 104 can take a single GPS reading of the data from GPS receiver 102 and store that single reading as the coordinates for the initial position. In the alternative, processor 104 can subject GPS samples from a fixed or variable period to statistical analysis. By way of non-limiting example, an initial position can be determined by averaging GPS coordinates taken at one sample per second over an eight-hour period; individual samples that appear particularly abnormal can be disregarded as aberrant, and the period and sample rate may be set as desired. Another method would be to form a bell curve based on the GPS coordinates and to take the most significant data (e.g., 50 per cent centered on the median). The result of the statistical analysis is used as the initial position of the interference detector 100.

An appropriate range of error is also decided upon and stored in processor 104 or memory 110, either by preprogramming, user interface, or remotely. As discussed in more detail below, the range of error represents how far a later-derived GPS coordinate can be from the initial position without generating a warning. The range of error may be uniform and omnidirectional, or vary based on direction and/or altitude. The range of error may be set before or after calibration.

With the initial position and range of error set, interference detector 100 periodically determines its GPS coordinates, preferably once per second, although other fixed or variable periods may be used. GPS receiver 102 selects the best combination of available GPS signals from the satellite network and derives/calculates the resulting GPS coordinates of interference detector 100. Processor 104 then compares the GPS coordinates with the coordinates of the initial position. If the GPS coordinates differ from the coordinates of the initial position by more than the range of error, then interference detector 100 issues a warning to monitoring unit 200 through communications device 106. In the alternative, processor 104 may issue a warning based on a percentage of errors, e.g., three out of five consecutive samples, or ten samples within an hour, are outside the range of error.

The calculation of GPS coordinates outside the range of error indicates that local interference is blocking the clean receipt of GPS signals from a combination of satellites that would otherwise result in GPS coordinates with an acceptable range of accuracy. With the resulting warning of the presence of interference, known techniques can be used to locate the source of the interference and neutralize the same; this may require interrogation of memory 104 to identify which satellites are being interfered with, and/or triangulation of interference effects on multiple interference detectors 100. By way of non-limiting example, if the interference were being generated by a spark gap in a generator at an airport, the generator would be located and repaired to remove the spark gap.

Interference detector 100 can also issue a warning if GPS receiver 102 does not receive enough satellite signals to derive a GPS position, the average GPS signal strength is below a certain threshold, or if the interference detector 100 has been moved beyond a threshold amount. All of these thresholds are adjustable.

Monitoring unit 200 receives the warnings and can display information on the status of interference detector 100 on display 210. Typically, interference detector 100 would be displayed on the map in green if its GPS coordinates are within the range of error, red if outside the range of error, or yellow if one of the other types of warning is received. Of course, various other forms of alerting users of warning conditions are possible. By way of non-limiting example, a single LED on a panel or an audio alarm can be used to alert a user of the warning.

In the preferred embodiment, certain operations, functions, and associated structures are associated with either interference detector 100 and/or monitoring unit 200. However, the invention is not so limited, and various allocations of these operations, functions, and associated structures may be made between these two components within the scope and spirit of the present invention. By way of non-limiting example, interference detector 100 may comprise only a GPS receiver and communications device such that it only sends the raw time codes to monitoring unit 200; in such a case, monitoring unit 200 would include the necessary hardware and software to perform all of the functions described herein.

According to another embodiment of the invention, other irregularities in GPS related data that are caused by interference can be monitored. By way of non-limiting example, in addition to or in the alternative to location, the system can store a variety of expected GPS parameters, such as the number of GPS satellites that the interference detector 100 is expected to receive at certain times, the specific satellites that interference detector 100 should receive at certain times, the expected signal-to-noise ratio (SNR) associated with those signals, the expected carrier-to-noise ratio (CNR), the expected SNR or CNR change over time, the pseudorange (i.e., absolute distance from satellite to GPS receiver) or range rate change, the expected signal power of various parameters (e.g., GPS signals), rates of change of SNR and CNR, in-band power density, etc. The interference detector is also capable of using an on-board or attached power meter accessory to detect in-band frequency interference. The aforementioned parameters are predicted and compared to the quantities actually detected.

The expected GPS parameters can be entered manually or computed automatically from known or calibrated information and stored in appropriate memory in either or both of the interference detector 100 or the monitoring unit 200. A range of error for each parameter (if any) can also be entered and stored at this time, or set at a later time. Some parameters change over time, e.g., the signal-to-noise ratio of a particular satellite will change over the course of a day as the satellite network moves over the horizon relative to interference detector 100. Other time-dependent parameters include: the number of visible satellites, satellite ID (SatID) list, SNR and SNR rate of change for each satellite, and pseudorange and range rate-of-change for each satellite. For time-dependent parameters, the expected values as a function of time are stored. Time dependent parameters may be stored as discrete entries or as an equation for a curve.

Once in operation, interference detector 100 will receive GPS signals from the GPS network in the manner noted above. The resulting GPS related data (e.g., one or more of location, number of satellites, signal-to-noise ratio, etc.) are compared with the expected GPS parameters. Deviation between the parameters of the received GPS signals and one or more of the expected GPS parameters (either by any amount or by a predetermined amount of tolerance as may be preset or set at the time of the comparison) represents an irregularity that indicates that local interference is blocking the clean receipt of GPS.

The irregularity may take any, or a combination, of many forms. By way of non-limiting example, the irregularity may be a single type of received GPS data that differs from the expected parameter, or multiple value/parameter combinations. The deviation could be from a comparison between the received GPS data and expected values or values that represent averages over time. The comparison could be with the GPS parameters of an individual interference detector 100. Alternately, or in addition, the comparison could be between or involve multiple units. By way of non-limiting example, one detector 100 might show a high signal-to-noise ratio when another detector 100 shows a low signal-to-noise ratio. Though both may be within tolerance, the divergence in data which should otherwise be consistent may be the result of interference. The comparison may be between all or part of the received GPS related data and all or part of the expected GPS parameters. Detection of an irregularity in one or more parameters may lead to further checking or rechecking against other parameters, possibly using reduced ranges of error.

Another type of irregularity is a discontinuity of data over time. Ideally, GPS data should fit a continuous smooth curve (with the possible exception of number of satellites in view). However, interference can disrupt GPS data and cause a discontinuity or "jump." Such deviations are detected as irregularities in the trend or moving average of the data.

Preferably, when an individual interference detector perceives an irregularity, it transmits data to that effect to monitoring unit 200. Whether the irregularity is determined by an interference detector or the monitoring unit 200, a warning is issued as described herein. Preferably, each interference detector 100 transmits data to monitoring unit 200 with or without an event occurrence. This transfer can be done in continuous relay-type fashion, or periodic bulk transfers of the GPS data.

Monitoring unit 200 is preferably a fixed-base station that monitors several dispersed interference detectors 100 that collectively cover an area, such as an airport. However, the invention is not so limited, as monitoring unit 200 may be a portable hand-held device, and may work in conjunction with a single unit.

Various features can be added to enhance the security of interference detector 100. As noted above, interference detector 100 is capable of detecting if it has been moved from its initial position. Communications devices 106 and 206 may communicate through known encryption techniques. The outer casing of interference detector 100 may include tamper detection elements that result in yet another warning being issued if the casing is tampered with.

A test unit constructed consistent with the above under the name GAMES includes the following.

The GAMES system includes a base station and multiple remote sensors that monitor the GPS signals and report back if any changes occur. The remote sensors have user-configurable sensitivities to reduce false positives. Other configurable settings are the report rate and data-logging rate. When a GPS anomaly is detected or a GPS anomaly resolves itself, an out-of-schedule report is sent to the base station. The base station receives that report through email and stores the information in a database. When an anomaly is either detected or resolved, the ArcView display is updated to show the current state of the sensor.

There are four types of messages that can appear within a GPS message: New Valid Position; Anomaly Set; Anomaly Cleared; and Periodic Log Message. The New Valid Position message is sent when the remote unit is initialized or a "Make Valid" button is pressed on the remote unit. It contains the accurate position of the sensor unit. It is this position that may be used to calculate position deviations.

There are four types of Anomaly Set messages; position, timeout, signal, and sats. This message is sent when the remote unit has decided that an anomaly has occurred. The anomalous conditions are that the latest position has deviated a specific distance from the known location, that there has been no GPS signal received for a specified time, that the average signal strength has fallen below a specified level, and finally, that the number of detected satellites has fallen below a specified threshold. All of the thresholds are user-settable. The Anomaly Cleared message is sent when the anomalous condition has been resolved.

The Periodic Log message contains time-averaged GPS data that can be stored in a database on the base station. The data contained within these messages can be used to determine if the threshold values for error conditions should be changed.

The GAMES_MFC application on the base station periodically checks the incoming email for messages with a subject of "GPS MSG". When one of these messages is received, it reads the message, extracts the text, parses it to extract the remote station's information, updates the database tables with the new information, and, if necessary, updates ArcView. There is a single button on the interface for shutting down the application. If the database is nonexistent or ArcView is not running when the application is started, it may fail to start.

Access is the database engine used to store all of the data received from the remote units. The database is called gps.mdb and contains three tables, sensor_name_tbl, sensor_valid_tbl, and sensor_data_tbl. The sensor_name_tbl contains the association between the sensor_name and the sensor_id used in all of the other tables. When a new sensor is brought online, the name is stored in this table and a unique sensor_id is created. All of the data that is received from the remote units is stored in the sensor_data_tbl. Only the latest valid position information is stored in the sensor_valid_tbl. This table also contains the latest state of the sensors.

The Games project in ArcView contains required scripts for the processing of the messages that arrive from the GAMES_MFC application. The incoming messages are all routed through the games_main script that parses the parameter list and then executes the appropriate games script. The other requirement of ArcView is the 3-D Analyst extension. This should be loaded because the themes created are all 3-D shape files.

The remote station includes an HP JORNADA connected to a MAGELLAN PROMARK GPS receiver and a TELULAR Analog Cell Phone Modem. All of this is contained along with batteries and battery charger in a Pelican case for waterproofing. There are two watertight coaxial connectors on the outside of the case for the GPS antenna and for the cellular telephone antenna. These antennas are contained within the case and should be removed and attached when setting up the unit. The antennas are attached to fiberglass rods that can be placed in holes in the outside of the Pelican case. Once the JORNADA's software is initialized and the antennas connected, then the case can be closed.

Figure 2:
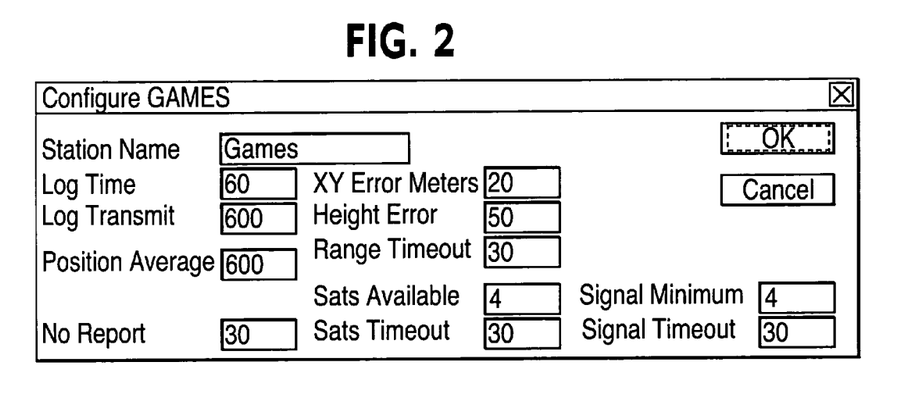
FIG. 2 shows the remote system configuration screen of an embodiment of the present invention.

The GAMES software on the JORNADA is started by double clicking on the GAMES icons on the desktop. The configure button should be pressed so that the following parameters can be set. FIG. 2 shows the remote system configuration screen. The parameters therein include:

| Parameter Name | Description | Units |
|---|---|---|
| Station Name | The unique name of the unit | text |
| Log Time | The period to wait between logging the position. | seconds |
| Log Transmit | The period to wait between sending the log information to the base station. | seconds |
| Position Average | The period to spend averaging the position before marking as the valid position. Used during the initialization period. | seconds |
| XY Error Meters | The horizontal distance away from the valid position that must be crossed to cause a range anomaly. | meters |
| Height Error | The vertical distance away from the valid position that must be crossed to cause a range anomaly. | meters |
| Range Timeout | The period the position must be outside the error distance before the position-moving anomaly is set. This time is also used for clearing the anomaly. Reduces the errors caused by a momentary fluctuation in position. Also referred to as a hysteresis value. | seconds |
| No Report | The period with no data from the GPS receiver before a timeout anomaly is sent. | seconds |
| Sats Available | The minimum number of satellites seen before a satellite count anomaly is set. | number |
| Sats Timeout | The hysteresis time before the satellite count anomaly is set or cleared. | seconds |
| Signal Minimum | The minimum RSSI allowed before the low signal anomaly is sent. | 0-9 |
| Signal Timeout | The hysteresis time before the low signal strength anomaly is set or cleared. | seconds |

Figure 3:
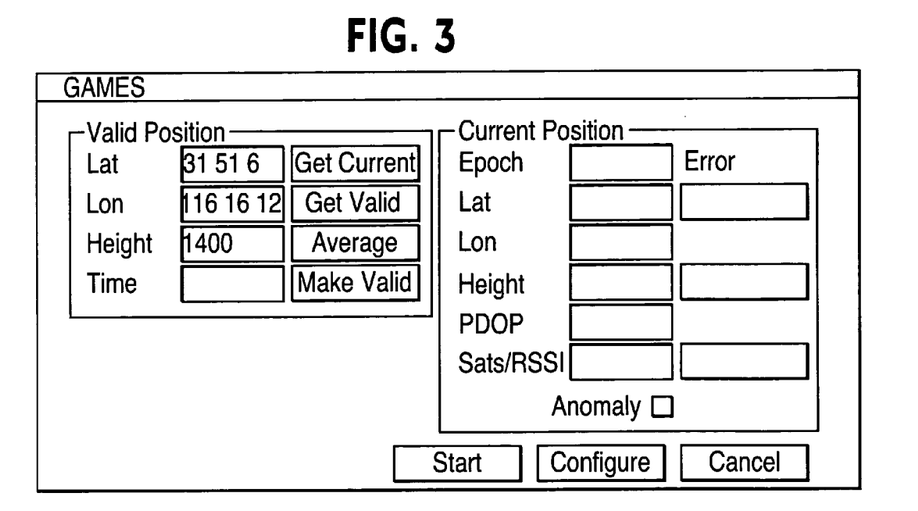
FIG. 3 shows the remote system main screen of an embodiment of the present invention.

FIG. 3 shows the remote system main screen. Once all of the configuration parameters are set then the OK button is pressed and the main screen is active again. Pressing the start button starts the software. An initial valid position is set by pressing the Average button, which averages the unit's position for the length of time specified on the configuration screen, or entering the unit's surveyed position and pressing make valid. The units on the Lat and Lon fields are decimal degrees and the Height field is meters. The current state of the unit is displayed on the right side of the main screen.

The base station software includes the GAMES_MFC application, ArcView, and Microsoft Access. There are no restrictions concerning the use of ArcView while the GAMES_MFC application is running in the background. The intention is that the operator should be analyzing the received data and monitoring the incoming data for changes.

Figure 4:
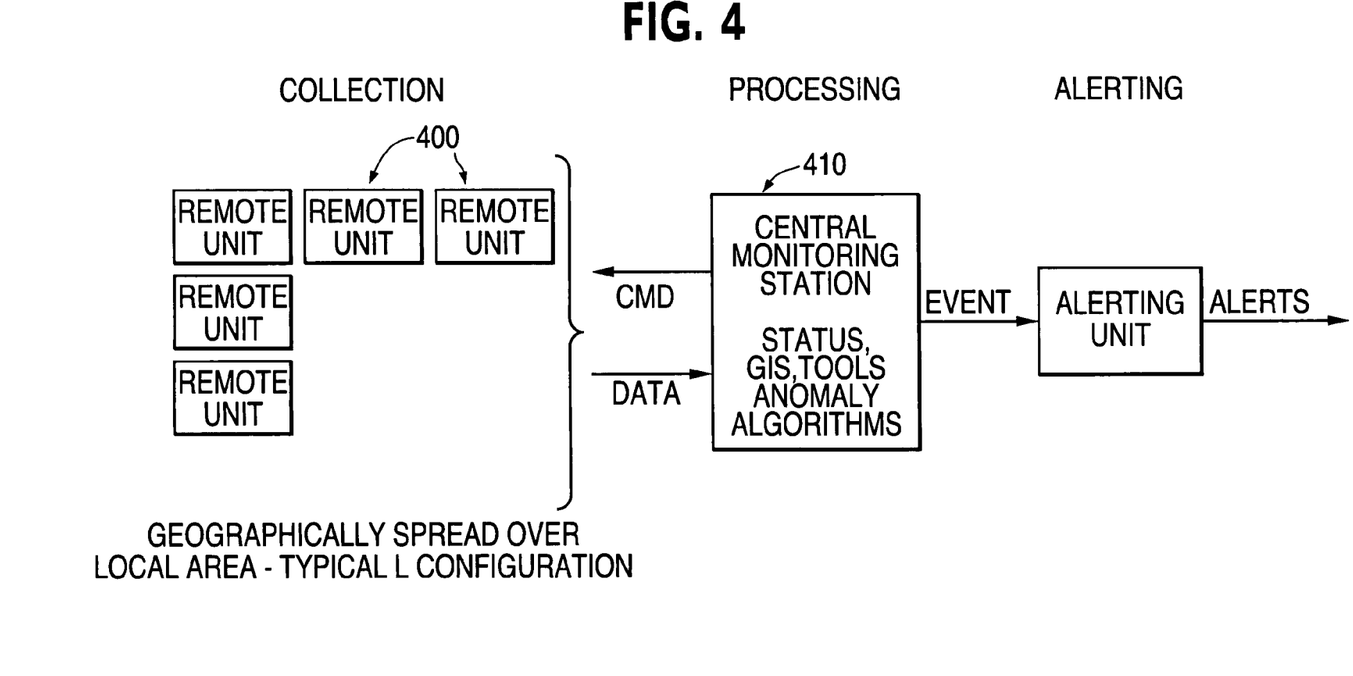
FIG. 4 shows another embodiment of the present invention.

FIG. 4 depicts another embodiment of the invention. This embodiment comprises a system made up of one or more interference detectors 400 and a monitoring unit 410, which collectively form a local area network. Interference detectors 400 ("remote units") are located about a facility, such as an airport. Interference detectors 400 receive, decode, and transmit GPS data to monitoring unit 410. Monitoring unit 410 receives data from the interference detectors 400 and compares the received GPS-related data with expected GPS parameters. Monitoring unit 410 may make this comparison for an individual interference detector 400, or collectively with data from a plurality of interference detectors 400. The comparison may use any or all of the comparison methods disclosed herein (e.g. those discussed above in reference to monitoring unit 200 and interference detectors 100). If an irregularity is detected, then monitoring unit 410 issues an appropriate warning. This may be done audibly or visually at monitoring station 410, by telephone paging, email, etc. As discussed further below, monitoring unit 410 is also capable of processing data from one or more interference detectors 400 and computing an approximate location of the interference source. Monitoring unit 410 also provides a user interface for the system.

Various known or expected GPS parameters for each of the interference detectors 400 are stored in a memory in monitoring unit 410, including location, the number of GPS satellites that a given interference detector 400 is expected to receive at given times, the identity of specific satellites that a given interference detector 400 should receive within certain times, the signal-to-noise ratio associated with those signals, the change in signal-to-noise ratio over time, the pseudorange or range rate change, the time domain signature of the interference signal (referenced to GPS time), and the signal power of various parameters noted herein. Monitoring unit 410 can detect interference when measured values deviate from expected values. This arrangement is resistant to spoofing attacks.

Figure 5A:
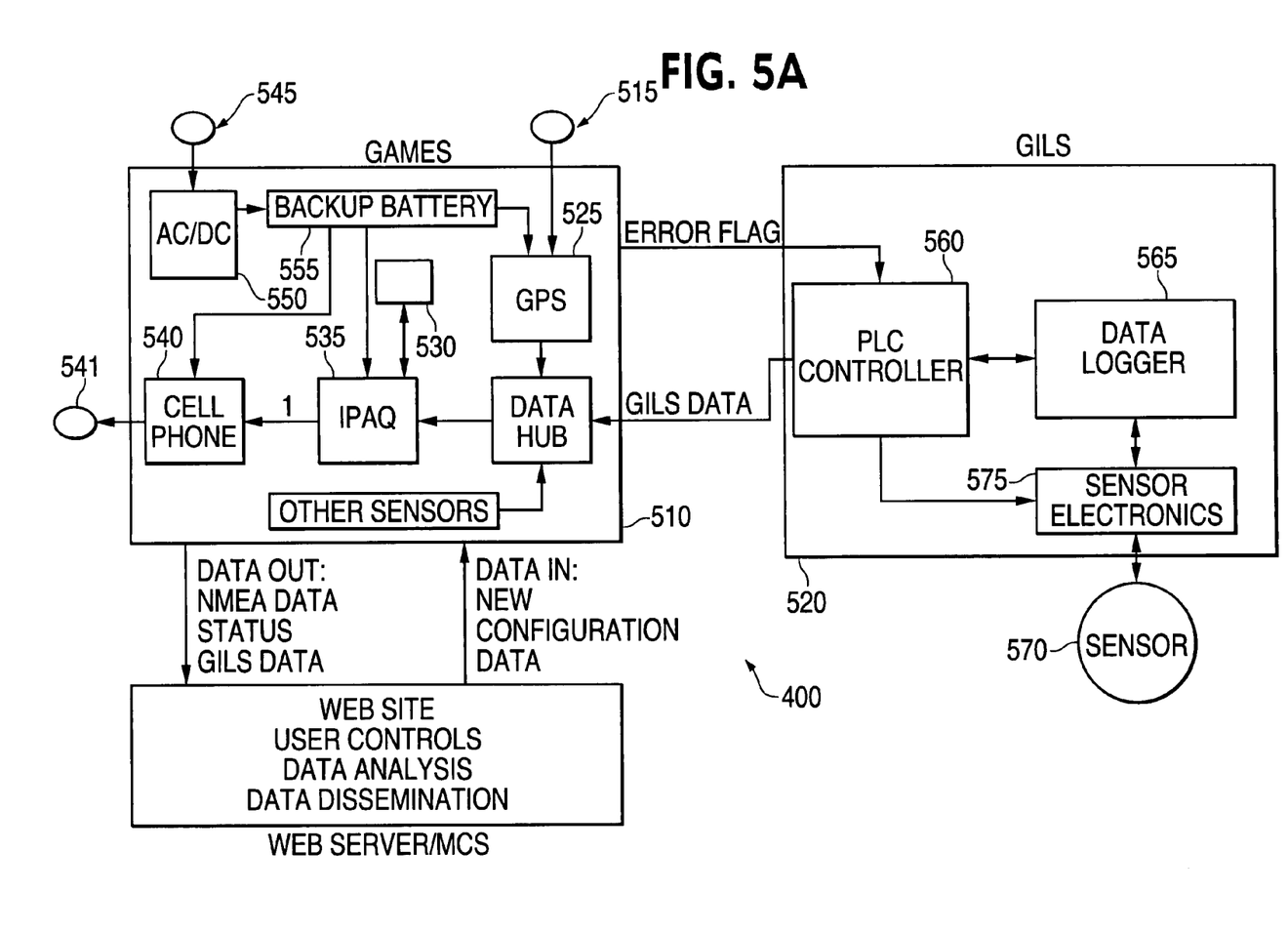
FIG. 5A is a schematic diagram of an interference detector according to the embodiment of FIG. 4.

FIG. 5A is a schematic diagram of interference detector 400. Interference detector 400 includes a GAMES unit 510 and a GPS Interference Locator System (GLS) module 520. GAMES unit 510 has all of the features of interference detector 100 of FIG. 1, and additional features described herein. GLS module 520 provides added computational capability and a sensor for GAMES unit 510. GAMES unit 510 supplies GPS data and error flags that identify detected anomalies, such as interference, to GLS unit 520. GILS unit 520 in turn processes GPS data and other detected data and returns processed data to GAMES unit 510. More particularly, GLS module is capable of capturing, processing, and passing to GAMES unit information about the interference source. Such information includes, by way of non-limiting example, power levels, power levels as a function of location, power levels as a function of angle, angles of highest power level, and GPS time-synched, time-domain interference signal profile data. These data are used by the location algorithms discussed further below. GAMES unit 510 then transmits the processed data to monitoring unit 410. Transmitted data includes, by way of non-limiting example, National Marine Electronics Association (NMEA) data, status data, and GILS processed data.

Figure 5B:
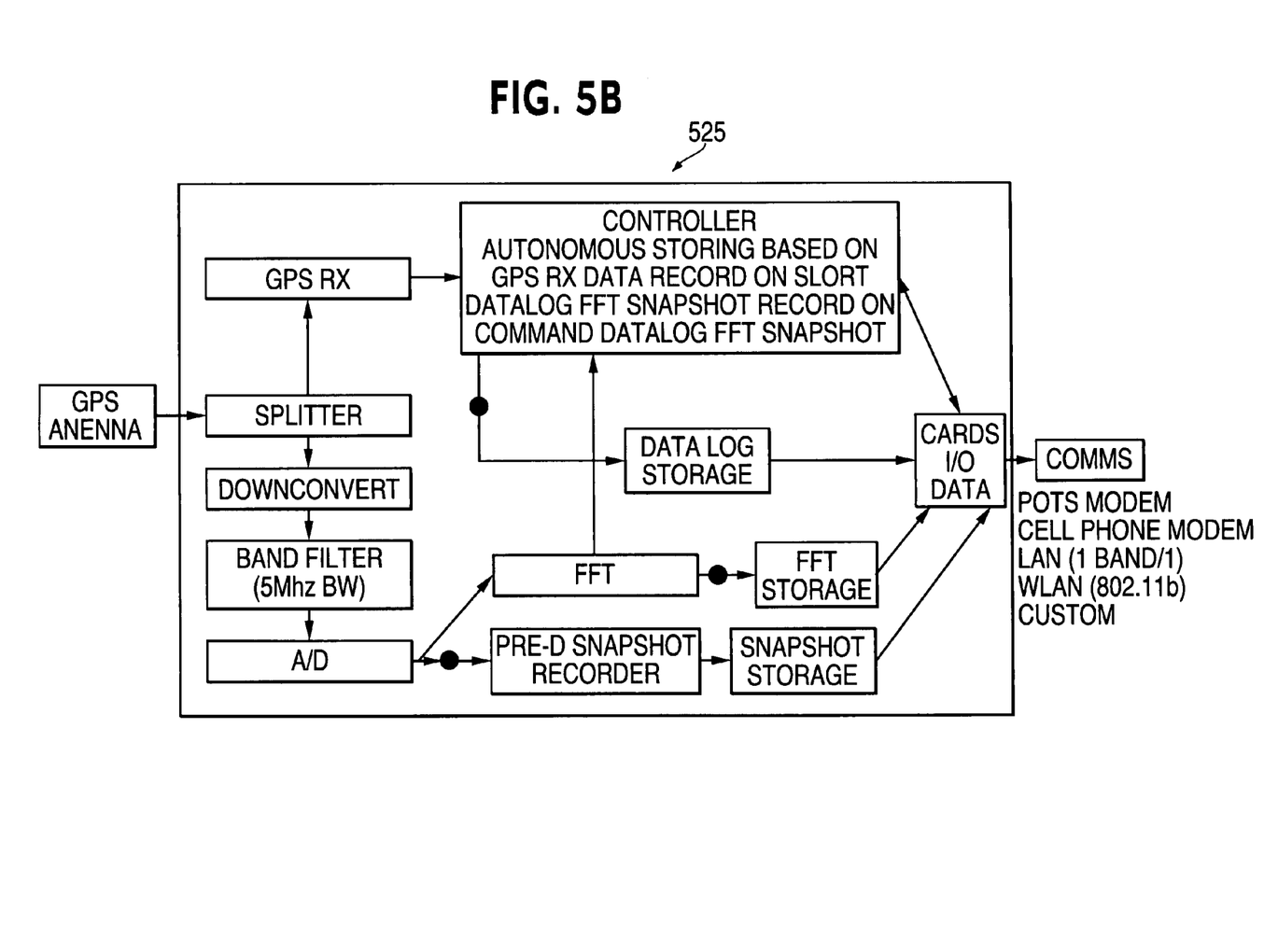
FIG. 5B is another schematic diagram of a GPS processor according to the embodiment of FIG. 4.

GAMES unit 510 includes a GPS receiving antenna 515, a GPS chip 525 (preferably a Conexant Jupiter 12 GPS Receiver, TU30-D400 Series), a memory 530, a processor 535 (preferably a Compaq IPAQ™), a cellular telephone modem 540, an external power source 545, a power converter 550, a broadcast antenna 541, and a rechargeable backup battery 555. Under control of the processor 535, the GPS unit 525 will receive GPS signals (either continuously or intermittently) and store the resulting GPS related data in memory 530. GPS unit 525 is capable of processing data in accordance with standard or differential GPS techniques. A detailed diagram of GPS unit appears as FIG. 5B. Also under control of the processor 535, GAMES unit 510 will periodically contact monitoring unit 410 and batch upload the contents of its memory to monitoring unit 410. This batch transfer preferably occurs at preset periodic intervals. Alternately, interference detector 400 continuously transmits data to monitoring unit 410. The interference detector 400 may be configured and monitored on site or remotely from monitoring unit 410.

GILS module 520 includes electronics to process the GPS data and alert flags received from GAMES unit 510. A programmable logic chip 560 serves as a input/output controller and also stores and implements algorithms for processing GPS data. Sensor 570 captures power and location information. Sensor 570 may be, by way of non-limiting examples, a phase-matched, ten-element antenna array, or disc-cone antenna. Sensor electronics 575 may include antenna motor controls if necessary (e.g., for a highly directional scanning antenna). GILS module 520 further includes a data logger 565, which itself includes a memory device such as a RAM chip. GILS unit 520 is optionally detachable from GAMES unit 510.

Monitoring unit 410 includes the features of monitoring unit 200, with additional features as described presently. Monitoring unit 410 preferably includes a web page interface for a system user in addition to transmission and reception hardware. A user may interact with the web page to view and control information processing from the interference detectors 400. Monitoring unit is capable of remotely controlling, commanding, and configuring interference detectors 400. A user may control each interference detector 400 by issuing commands through the web page. Monitoring unit 410 may send configuration and other data (e.g., reporting rate, error range, and location information if known) to individual or collective interference detectors 400. Further, the web page interface allows for efficient dissemination of the received and processed data. A user may process data in accordance with any of the techniques disclosed herein by issuing commands at the web page interface.

Communication between interference detectors 400 and monitoring unit 410 is preferably two-way. Preferably, interference detectors transmit data to monitoring unit 410 regardless as to whether an irregularity or warning is present. Modes of transmission between interference detector 400 and monitoring unit include, by way of non-limiting examples, wired LAN (e.g., Ethermet/1394), landline phone (e.g., POTS), cellular phone, wireless LAN (e.g., 802.11 or BLUETOOTH™), radio frequency (e.g., directional or broadcast), and optical (e.g., optical/fiber/laser-air). A user may communicate with interference detectors 400 directly through monitoring unit 410, or via a network such as the Internet through monitoring unit 410.

The monitoring unit 410 is configured to instruct one or more of interference detectors 400 to either increase the rate at which they sample signals from the GPS network, or the rate of batch transfer. Typically this occurs manually or automatically in response to a warning to provide additional data for analysis. Monitoring unit can also alter the parameters of each interference detector 400.

Monitoring unit 410 working in conjunction with interference detectors 400 is configured to provide an approximate location of the interference source. As discussed further below, non-limiting examples of methods for detecting the approximate location of an interference source include Power Difference On Arrival (PDOA, also known as signal-to-noise ratio cross-correlation), time of arrival (also known as Time Difference Of Arrival, TDOA, or time of arrival shift), Angle Of Arrival (also known as AOA or line of bearing), or terrain/elevation masking.

The Power Difference on Arrival (PDOA) methodology uses the power of the interference signal measured at each interference detector 400 to calculate a position. Once a signal-to-noise ratio is detected that indicates the presence of an interference signal, one of two PDOA methods can be used to approximate its location.

Figure 6:
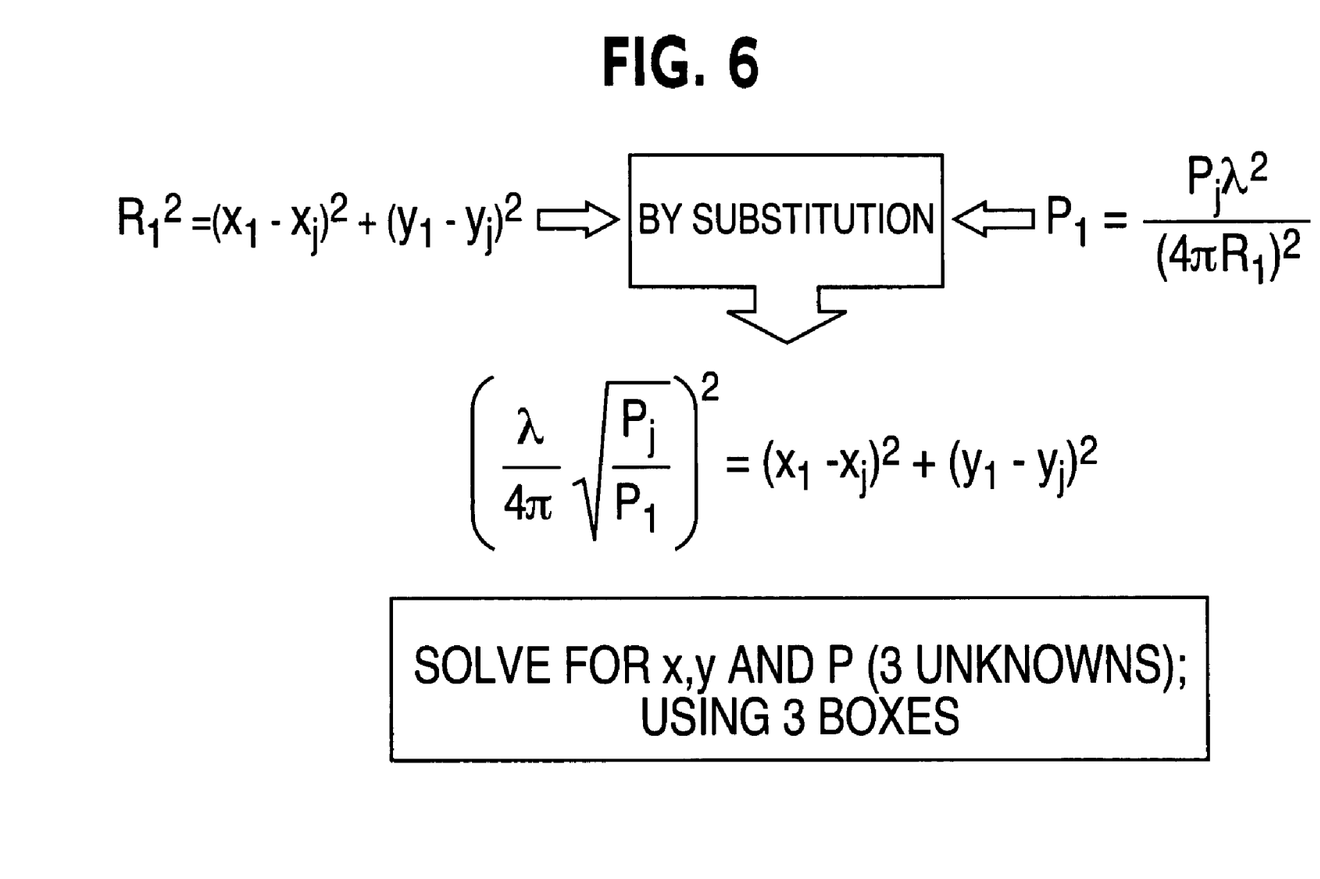
FIGS. 6 and 7 show equations for use in power difference on arrival methodology.

The first PDOA location method uses an equation with three unknowns of the interference source: latitude=$x_j$, longitude=$y_j$, and broadcast power=$P_j$ of the interference signal. This equation and its derivation are shown in FIG. 6. In this equation, the (known) variables for a first interference detector 400 are: latitude=$x_I$, longitude=$y_I$, and measured power=$P_I$ of the interference signal received at the location of the first interference detector. The symbol $\lambda$ represents the wavelength of the applicable GPS signal (e.g., L1, L2, or L5). $R_I$ represents the distance between the interference source and the first interference detector (this quantity is not required except to derive the main equation). The interference source emitted power $P_j$ and the power $P_I$ measured at the first interference detector are measured in watts. Analogous equations are determined for a second a third interference detector 400. In this manner, three equations of three unknowns are formed, and the system of equations is solved for the interference source variables $x_j$, $y_j$, and $P_j$. Power may be measured according to techniques and apparatuses discussed herein (e.g., attached or internal power meter, GPS antenna, disc-cone antenna, scanning antenna, or GLS sensor 570, which may include any of the preceding). The power information is typically detected by GLS module, passed to GAMES unit, and transmitted to monitoring unit 410 for calculations according to FIG. 6. Monitoring unit 410 provides an estimate of the position of an interference source assuming free space path loss, one source, and omni-directional emission.

Figure 7:
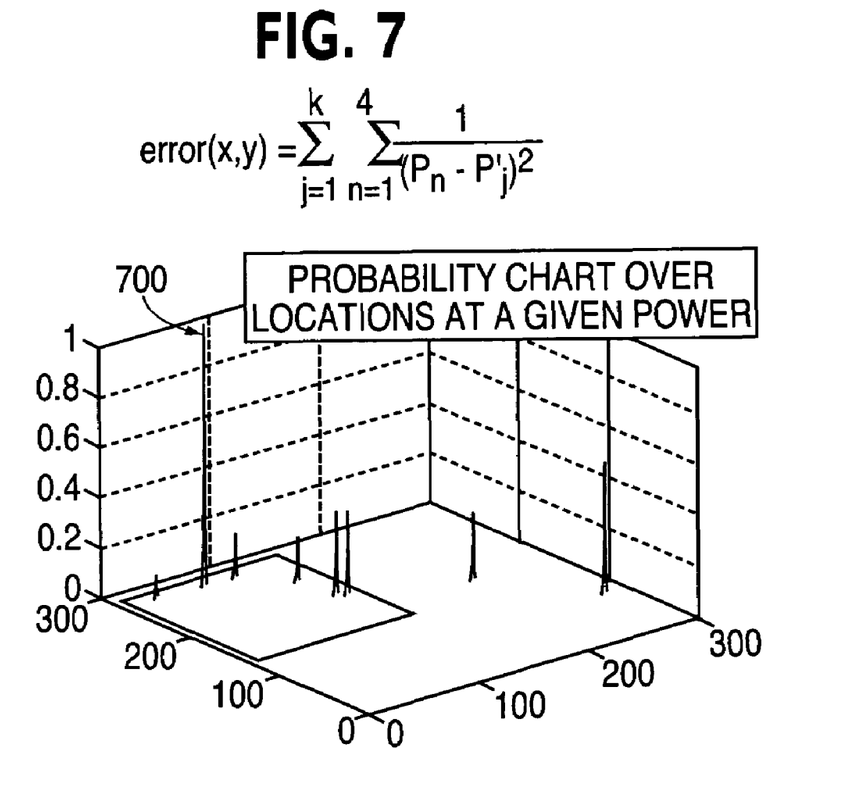

The second PDOA location method uses calculated loss data (e.g., Terrain Integrated Rough Earth Model or TIREM data) to perform a probability analysis on the power measurements. Again, power information is detected by GILS module and processed by monitoring unit 410 as discussed above in reference to the technique of FIG. 6. From the detected data, monitoring unit 410 calculates an error between a theoretical power and the actual detected power, using the one-over-the-mean-square-error formula as depicted in FIG. 7. A demonstrative example of the resulting probability chart is shown in FIG. 7. The path loss for each interference detector 400 to every point in a 20-by-20 mile region (with 10 meter resolution) is calculated via TIREM and stored in a data matrix (typically, one for each interference detector 400). By postulating several interference power levels $P_j$, the theoretical power levels can be compared to the measured power levels and an error computed for each location in the region. The error is taken as a probability weight. When the sets of probabilities from at least four interference detectors are summed over the postulated interference levels and normalized, a probable location of the interference source can be determined. Specifically, for a postulated location (x,y) of the interference source, the error function sums terms over k postulated power levels $P_j$ of the interference source, and sums over each interference detector's actual power measurement $P_n$ of the interference signal. Typically, k=6 postulated power levels are used with $P_j$=0.001, 0.01, 0.1, 1, 10, and 100 watts. The summed terms are the reciprocal of the square of the difference between the power $P_n$ that the n-th interference detector actually detects, and the power $P_j'$ it would detect if an interference source of power $P_j'$ were located at (x,y). Hence, the error function is large if the difference is small, i.e., if the predicted power $P_j'$ received at the n-th interference detector is close to the actual power $P_n$ received at the n-th interference detector. FIG. 7 illustrates a graph of the error function as a function of latitude x and longitude y, with a spike 700 at the most probable computed location of the interference source.

Figure 8:
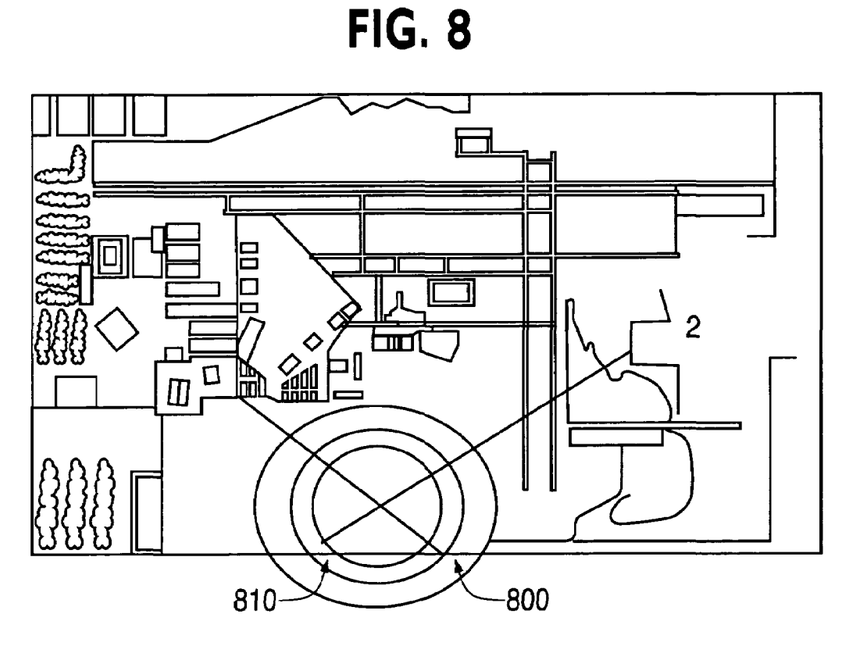
FIG. 8 shows an example of angle of arrival methodology.

The Angle of Arrival (AOA) methodology determines a Line of Bearing (LOB) from each interference detector 400. With at least two LOBs, the approximate position of the interference source may be identified. Many different AOA sensors and their associated algorithms may be used. AOA sensors may include antennas with a plurality of directionally receptive elements, or single scanning antennas. By way of non-limiting example, a Control Reception Pattern Antenna (CRPA, e.g., a disc-cone antenna), a small aperture antenna array, or a scanning (e.g., rotating) highly directional antenna may be used in each interference detector 400. FIG. 8 shows how triangulation from two interference detectors 400 provides an approximate location of a source of interference. Two interference detectors 1, 2 use AOA technology to determine their respective LOBs 800, 810. GWLS module 520 processes data from sensor 570 in accordance with AOA algorithms and passes the result to GAMES unit 510. GAMES unit 510 uses the received data to calculate the intersection point(s) of the LOBs, which approximate the location of the interference source.

Figure 9:
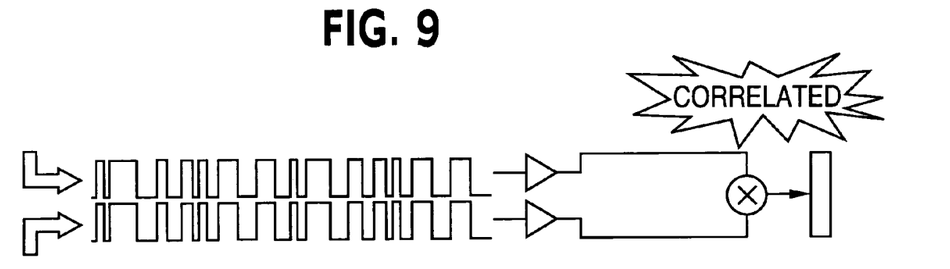
FIG. 9 shows an example of time difference on arrival methodology.

The Time Difference of Arrival (TDOA) methodology determines the time difference in the signal transmission paths to calculate the difference in the distance from each interference detector 400 to the interference source. The methodology uses GPS time to synchronize interference signal samples received at each interference detector 400. In response to GAMES unit 510 passing an error flag, GILS module 520 captures an interference signal time domain profile synchronized to GPS time. This data is passed to GAMES unit 510 and then forwarded to monitoring unit 410. Monitoring unit 410 correlates signals received from multiple interference detectors 400. Monitoring unit then calculates the time difference in arrival of the interference signal for each pair of interference detectors 400. A baseline distance between any two interference detectors is known, and the difference in distances from the interference source to each interference detector respectively is calculated. Each pair of interference detectors thereby provides data to compute a hyperbola representing possible locations of the interference source according to this difference in distance. Three interference detectors form three pairs of interference detectors, with each pair supplying data for calculating a hyperbola. The intersection of these three hyperbolas represents the location of the interference source. Signals from three interference detectors 400 can be used to determine the position of the interference source $(x_j, y_j)$. FIG. 9 shows an example of such correlation for two interference detectors 400 where the interference source is 0.00001523×speed of light =~4.5 Km farther from the one sensor compared to the other.

Terrain/elevation masking is used in conjunction with topographical data to determine the location of the interference source. Elevation or topographical features might block the line-of-sight between interference detector 400 and the interference source. This causes interference detectors 400 with an obstructed view to the interference source to receive a less powerful interference signal than those with an unobstructed view. In each interference detector, power data of the interference signal is captured by GILS module 520, passed to GAMES unit 510, and transmitted to monitoring unit 410. Monitoring unit 410 uses Digital Terrain Elevation Data (DTED) and/or Terrain Integrated Rough Earth Model (TIREM) data to determine practical "view sheds," or line-of-sight regions of each interference detector 400. By correlating each interference detector's view shed with its detected interference signal power level, monitoring unit 410 can predict likely locations of the interference source using known techniques.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A system for detecting the location of a signal source, said system comprising:
    a first GPS receiver configured to receive a GPS-related information;
    a first processing system configured to calculate a derived GPS parameter from at least the GPS-related information and compare the derived GPS parameter and an expected GPS parameter;
    a first sensor configured to detect first information of the signal source;
    a second processing system configured to calculate, from at least the first information, data representing a probable location of the source of the signal; and
    a user interface configured to display the data;
    wherein the user interface displays the data in response to the first processing system determining that the derived GPS parameter and the expected GPS parameter differ by at least a predetermined amount.

2. The system of claim 1 wherein said first processing system comprises a first processor at a remote location configured to calculate the derived GPS parameter from at least the GPS-related information and a second processor at a monitoring unit configured to compare the derived GPS parameter and the expected GPS parameter.

3. The system of claim 1 further comprising:
    a second GPS receiver configured to receive second GPS-related information;
    a third processing system configured to calculate second derived GPS parameter from at least the second GPS-related information; and
    a second sensor configured to detect second information of the signal source.

4. The system of claim 1 wherein the first GPS receiver is configured to receive GPS-related information comprising at least one of: a number of GPS satellites received by said first GPS receiver, a set of specific satellites received by said first GPS receiver, a signal-to-noise ratio associated with a GPS satellite signal received by said first GPS receiver, a carrier-to-noise ratio associated with a GPS satellite signal received by said first GPS receiver, a satellite pseudorange determined by said first GPS receiver, a rate of change of a satellite pseudorange, a rate of change of a signal-to-noise ratio associated with a GPS satellite signal received by said first GPS receiver, a rate of change of a carrier-to-noise ratio associated with a GPS satellite signal received by said first GPS receiver, a power associated with a GPS satellite signal received by said first GPS receiver, and an in-band power density of a signal received from a GPS satellite by said first GPS receiver.

5. The system of claim 1, wherein said first sensor is configured to determine at least one of: a power level of said signal, a time of arrival of said signal, a line of bearing of said signal, and a signal power as a function of angle.

6. The system, of claim 1 wherein said first GPS receiver is remote from said user interface.

7. The system of claim 1 wherein said second processing system at least partially computes the probable location data using at least one of: a power difference on arrival calculation, a time difference of arrival calculation, an angle of arrival calculation, and a terrain/elevation masking calculation.

8. A method for detecting errors in GPS accuracy, comprising:
   receiving first GPS-related data at a first marker device;
   calculating, from the first GPS-related data, a first GPS parameter for the first marker;
   receiving second GPS-related data at a second marker device different from the first marker device;
   calculating, from the second GPS-related data, a second GPS parameter for the second marker;
   comparing the first GPS parameter and the second GPS parameter; and
   issuing a warning if the comparison indicates an irregularity between the first GPS parameter and the second GPS parameter.

9. The method of claim 8, wherein said comparing occurs at a central monitoring unit.

10. The method of claim 8, further comprising:
    identifying, in response to said issuing, a potential source of local interference; and
    neutralizing the source of local interference.

11. The method of claim 8, wherein the first GPS parameter and the second GPS parameter comprise at least one of: a quantity of GPS satellites received by the respective marker, a set of specific satellites received by the respective marker, a signal-to-noise ratio associated with a GPS satellite signal received by the respective marker, a carrier-to-noise ratio associated with a GPS satellite signal received by the respective marker, a satellite pseudorange determined by the respective marker, a rate of change of a satellite pseudorange, a rate of change of a signal-to-noise ratio associated with a GPS satellite signal received by the respective marker, a rate of change of a carrier-to-noise ratio associated with a GPS satellite signal received by the respective marker, a power associated with a GPS satellite signal received by the respective marker, and an in-band power density of a signal received from a GPS satellite by the respective marker.

12. A system for locating a source of interference in GPS signals, the system comprising:
    a plurality of GPS devices each configured to receive GPS-related data; and
    a monitoring unit configured to detect at least one irregularity in a GPS parameter derived from at least a first portion of the GPS-related data, said monitoring unit comprising:
    a user interface configured to issue a warning in response to said monitoring unit detecting an irregularity; and
    a processor configured to calculate an approximate location of a potential source of interference based on at least a second portion of the GPS-related data.

13. The system of claim 12 wherein said GPS parameter for each GPS device of said plurality of GPS devices comprises at least one of: a number of GPS satellites received by said GPS device, a set of specific satellites received by said GPS device, a signal-to-noise ratio associated with a GPS satellite signal received by said GPS device, a carrier-to-noise ratio associated with a GPS satellite signal received by said GPS device, a satellite pseudorange determined by said GPS device, a rate of change of a satellite pseudorange determined by said GPS device, a rate of change of a signal-to-noise ratio associated with a GPS satellite signal received by said GPS device, a rate of change of a carrier-to-noise ratio associated with a GPS satellite signal received by said GPS device, a power associated with a GPS satellite signal received by said GPS device, and an in-band power density of a signal received from a GPS satellite by said GPS device.

14. The system of claim 12 wherein the irregularity comprises at least one of: a discontinuity over time in GPS-related data received by a single GPS device, a predetermined difference between expected and measured GPS-related data received by a single GPS device, and a predetermined divergence among GPS-related data received from the plurality of GPS devices.

15. The system of claim 12 wherein said processor is configured to calculate the approximate location using at least one of: a power difference on arrival calculation, a time difference of arrival calculation, an angle of arrival calculation, and a terrain/elevation masking calculation.

16. The system of claim 12 wherein at least each of the first and second portion of the GPS-related data represents at least one of: a power level of the interference, a time-synchronization of the interference, a line of bearing of the interference, and a power level of the interference as a function of angle.

17. A method for detecting errors in GPS accuracy, the method comprising:
    detecting, at a plurality of locations, GPS-related data;
    calculating at each respective location GPS-related information from the GPS-related data; and
    sending the GPS-related information to a central monitoring unit from each location;
    wherein the central monitoring unit determines the existence of a signal causing an error in GPS accuracy.

18. The method of claim 17, further comprising identifying, at the central monitoring unit, a probable location of a source of the signal.

19. The method of claim 17, further comprising receiving at least one of configuration and control instructions from the central monitoring unit.

20. The method of claim 17 wherein the GPS-related data comprises at least one of: a number of GPS satellites received by a GPS device, a set of specific satellites received by a GPS device, a signal-to-noise ratio associated with a GPS satellite signal received by a GPS device, a carrier-to-noise ratio associated with a GPS satellite signal received by a GPS device, a satellite pseudorange determined by a GPS device, a rate of change of a satellite pseudorange, a rate of change of a signal-to-noise ratio associated with a GPS satellite signal received by a GPS device, a rate of change of a carrier-to-noise ratio associated with a GPS satellite signal received by a GPS device, a power associated with a GPS satellite signal received by a GPS device, and an in-band power density of a signal received from a GPS satellite by a GPS device.

21. The method of claim 17, further comprising the central monitoring unit detecting at least one of: a discontinuity over time in GPS-related data received from a single GPS device, a predetermined difference between expected and measured GPS-related data received from a single GPS device, and a predetermined divergence among GPS-related data received from a plurality of GPS devices.

22. A method for detecting errors in GPS accuracy, comprising:
- receiving GPS-related data at a marker;
- calculating, from the GPS-related data, at least one derived GPS parameter for the marker;
- comparing the at least one derived GPS parameter with a corresponding at least one expected GPS parameter; and
- issuing a warning if the comparison indicates an irregularity between any of the derived GPS parameters and any of the corresponding expected GPS parameters;
- wherein the expected GPS parameter and the derived GPS parameter comprise at least a quantity of GPS satellites received by the marker.

23. A method for detecting errors in GPS accuracy, comprising:
- receiving GPS-related data at a marker;
- calculating, from the GPS-related data, at least one derived GPS parameter for the marker;
- comparing the at least one derived GPS parameter with a corresponding at least one expected GPS parameter; and
- issuing a warning if the comparison indicates an irregularity between any of the derived GPS parameters and any of the corresponding expected GPS parameters;
- wherein the expected GPS parameter and the derived GPS parameter comprise at least a set of specific satellites received by the marker.

* * * * *

UNITED STATES PATENT AND TRADEMARK OFFICE
CERTIFICATE OF CORRECTION

PATENT NO.       : 7,512,492 B2                               Page 1 of 1
APPLICATION NO.  : 10/270236
DATED            : March 31, 2009
INVENTOR(S)      : Dean Irwin et al.

It is certified that error appears in the above-identified patent and that said Letters Patent is hereby corrected as shown below:

On the title page, line (75), change "Irvin" to read "Irwin."

Signed and Sealed this
Twenty-fifth Day of August, 2015

Michelle K. Lee
*Director of the United States Patent and Trademark Office*